Sept. 14, 1954 W. E. BURNS 2,688,953
ELECTROMAGNETIC SIGNAL-RECEIVING AND HYDRAULICALLY
RESPONSIVE AUTOMATIC CONTROL
MEANS, SYSTEM, AND METHOD
Filed Nov. 30, 1944 3 Sheets-Sheet 2
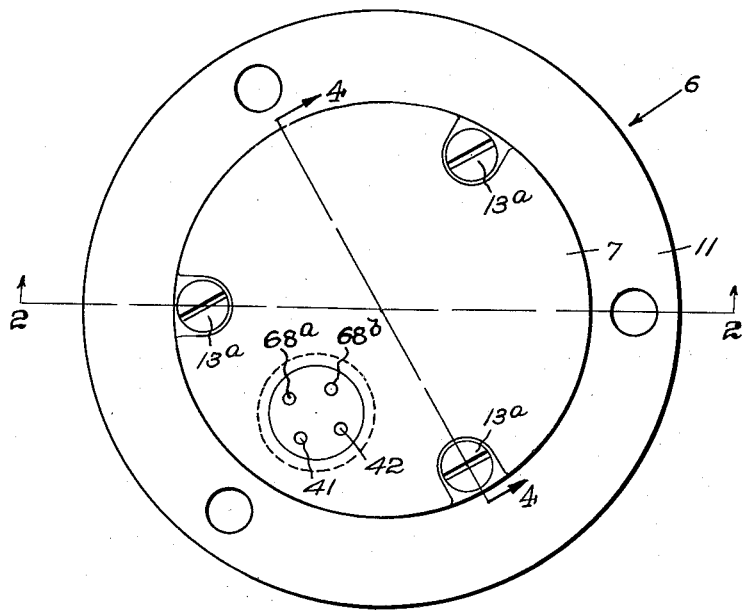
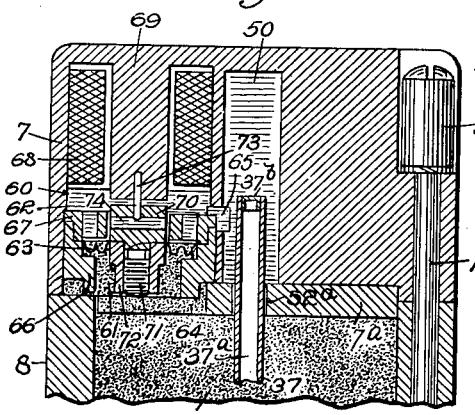
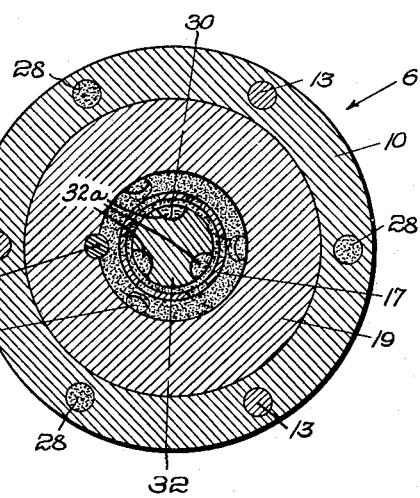
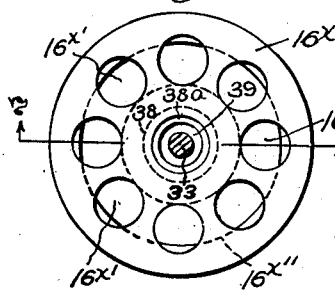
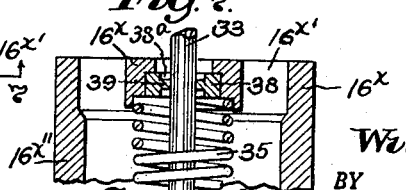
INVENTOR.
William E. Burns
BY
Emery, Booth, Townsend, Miller & Weidner
Attys Sept. 14, 1954  W. E. BURNS  2,688,953
ELECTROMAGNETIC SIGNAL-RECEIVING AND HYDRAULICALLY
RESPONSIVE AUTOMATIC CONTROL
MEANS, SYSTEM, AND METHOD
Filed Nov. 30, 1944  3 Sheets-Sheet 3
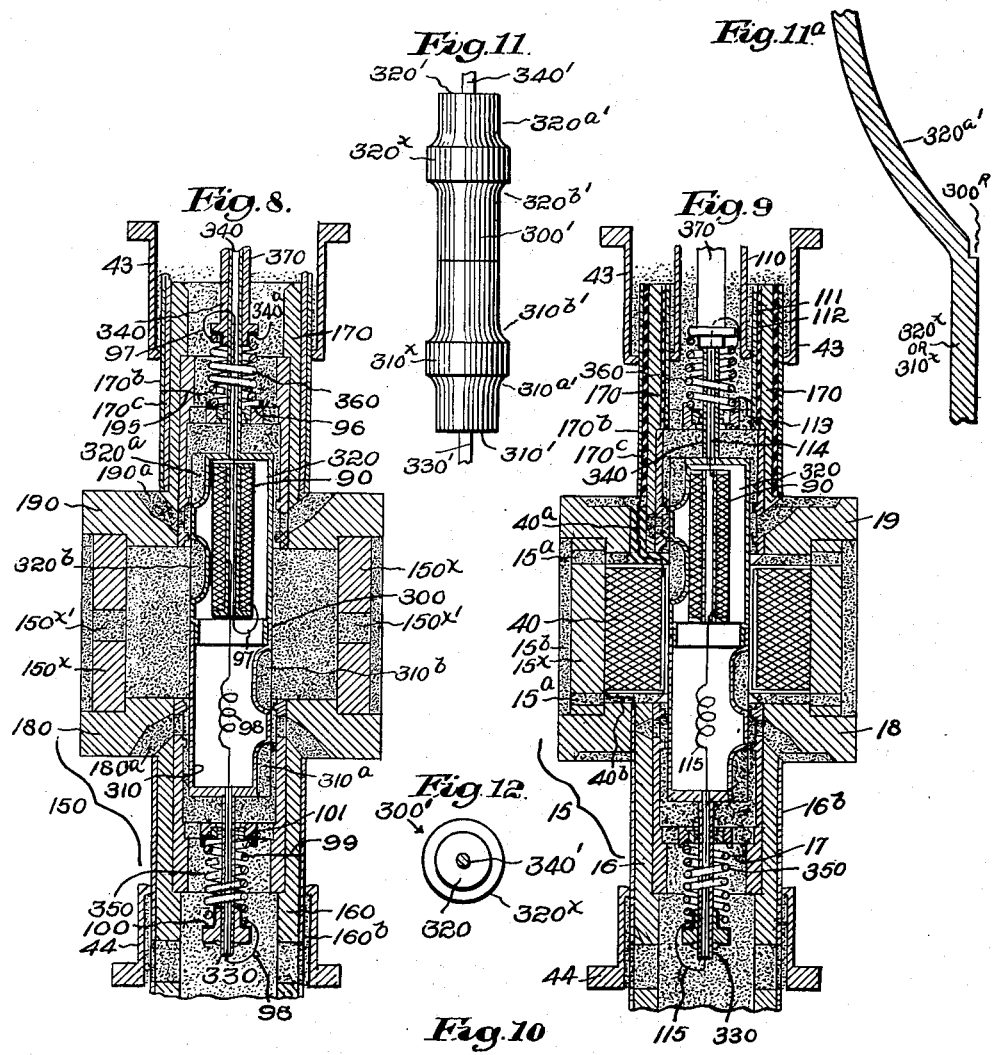
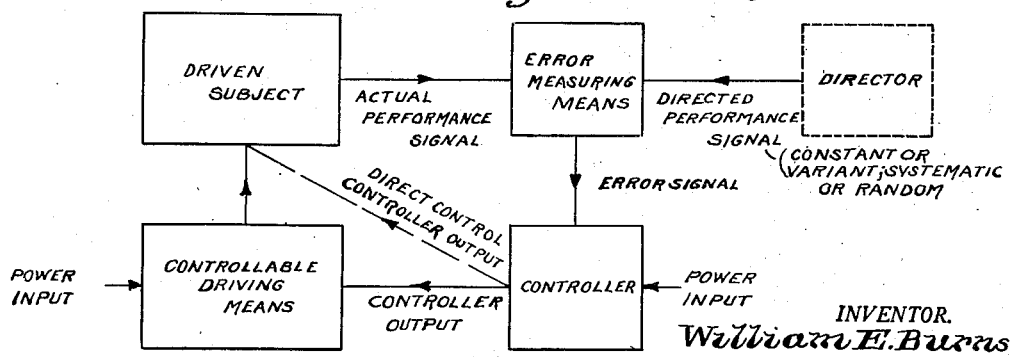
INVENTOR.
William E. Burns
BY
Emery, Booth, Townsend, Miller & Widner
Attys Patented Sept. 14, 1954

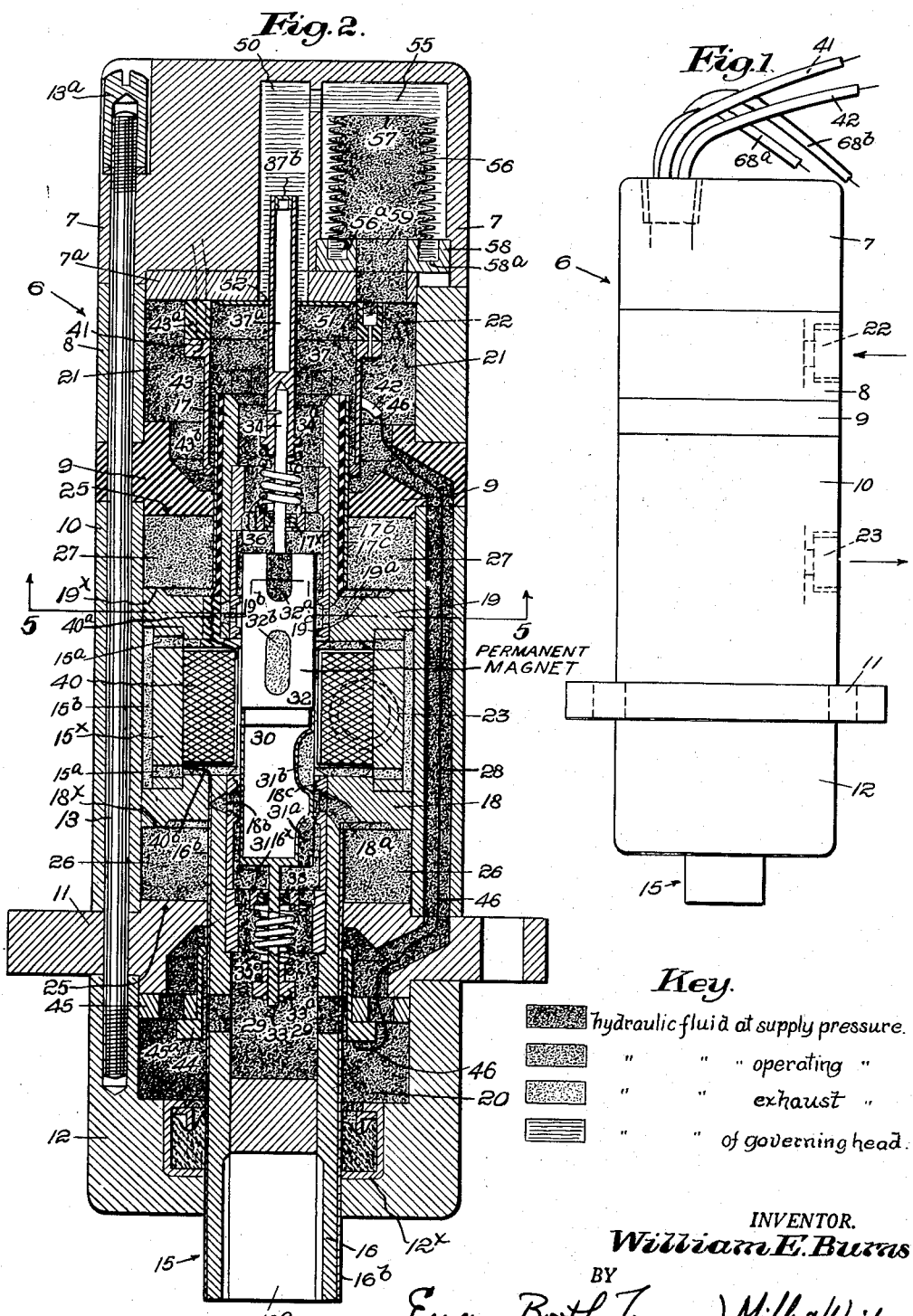

2,688,953

UNITED STATES PATENT OFFICE 2,688,953

ELECTROMAGNETIC SIGNAL-RECEIVING AND HYDRAULICALLY RESPONSIVE AUTOMATIC CONTROL MEANS, SYSTEM, AND METHOD

William E. Burns, Norfolk, Mass.

Application November 30, 1944, Serial No. 565,889

15 Claims. (Cl. 121—41)

My present invention broadly concerns methods and means, herein embodied in a device termed a controller, for the reception of directive information or signals, generally electrical and of a relatively low power, and for the attendant production of mechanical displacements or motions, usually of a higher power, which are functions of the signals and of their variation with time.

In one of its aspects, that involving output at an increased power level, the invention pertains to power amplification, and the means of the invention constitutes and is useful as a power amplifier. In such applications, particularly where the input is at an extremely low power level, the operation ordinarily is susceptible to distortion by unintended extraneous influences which are largely unpredictable. For example, in the low-power mechanical system such influences include surface-to-surface or Coulomb friction, backlash, shock and like acceleration, and others. The present invention has among its important aims to provide methods and means, in keeping with simplicity and compactness, whereby such undesired influences are reduced.

An important consideration, frequently a determining factor in various applications of controllers and amplifiers, is that of structural compactness. In its various aspects and uses the invention therefore aims to achieve compactness to a marked degree in its embodiments of means and in the practice of its novel methods. Numerous features making for such compactness will be evident from the present disclosure. This aim of compactness also is closely associated with the further objects of simplicity, and of ease of installation and replacement.

More particularly the invention relates to the control of subjects, apparatus or bodies to be moved or adjusted in conformity with more or less remote director or information sources. It has important application in and to control systems associating a subject or thing to be controlled, a directing instrumentality, and a medium for detecting and signalling the existence of some error as between the performance called for by the directing instrumentality and that actually effected by or for the thing controlled. The latter may present a considerable mass, although not necessarily so, and may be under load to a greater or less degree. In various applications of the invention the subject for example may require to be driven at variable speeds and with precision, as by hydraulic or other physical means.

Among the important objects of the invention is to improve the control or operative adjustment of hydraulically or otherwise power-driven devices, mounts and apparatus remotely directed, as for example in servo-control systems and the like wherein electrical signals representative of variation or error, in position or otherwise, as between the director and the subject driven are converted to mechanical signals, at increased power levels, productive of the appropriate modification or correction. In accordance with the invention such operative modification or correction is effected with increased certainty, speed and precision. Further, the means and methods of the control system of the invention may incorporate modifying or corrective provisions for certain variable factors associated with the given director or information source or with the particular subject to be controlled, so as to make anticipatory provision against error that would otherwise appear, as for example overtravel after a sudden or extensive adjustment demanded by the incoming signals. Such provisions may include anticipation of and automatic correction for errors associated with or arising from various influencing factors within or following the control, up to and including the controlled subject. One such influencing factor may be the mass loading on the output member which but for the anticipating corrective provision might give rise to error in driven-member position owing to the inertia of the mass. This potential error is anticipated and compensated within the controller by an automatic utilization of physical manifestations of rate of change of error, of whether the error is increasing or decreasing, of the direction of error, and of an accumulation of the near history of error. Other influencing factors are elasticity in the power transmission means, mechanical characteristics such as other types of loading, the size and proportions of parts, and other factors in or following the control and up to and including the ultimate driven subject.

While the invention is applicable generally in the field of directive control of mechanical movements and operations subject to more or less frequent or substantially continuous and differential adjustment in the desired performance of the functions concerned, it is especially adapted for use in synchronizing and servo-control systems in which the controlled work is accomplished through a variable speed hydraulic transmission. Among such applications the invention is particularly suited for such services as automatic piloting, ordnance fire control, level maintenance, and numerous others.

More particularly, important objects and advantages of the invention include: the provision of a stabilized but sensitive control pilot element; the reference of a control pilot element directly to a zero signal as contrasted with a composite reference therefor involving output factors; the introduction of an electrically responsive, mechanically effective primary control element on or in a higher-powered element the output of which is to be controlled; the provision of a control pilot which is not required to return to a predetermined absolute neutral reference position thereof at times when the error signal is zero and when its history of change is remote, the term "absolute" here meaning with reference to the body, frame, housing or mount of the controller, and history of error change being regarded as "remote" at times when certain governor means adapted to modify the action of the pilot element has a negligible net force relation to said element aside from possible friction-reducing effect thereon; the provision of a control pilot which in the direction of the displacement during operative motion is free of connection within the controller to the frame or mounting of the containing unit through any mechanical member or chain of members other than hydraulic means; the provision of a substantially full-floating output element and the provision of a pilot or primary signal-responsive control element which is relatively insensitive to non-signaled influences such as shock or gravity, aside from certain deliberate corrective influences in the controller; the methods and means for application of supplementary forces to a control pilot piston valve or other element where the primary force is a directive or signal force exerted on such element by a low-power electrical to mechanical converter; the avoidance of resort to feedback of controller output to, or other compensatory effect on a controlling pilot more or less directly from or with reference to the displacement of the control output element; and various features of structure, design and operation whereby objectionable friction of all types is minimized. The invention further aims to afford a control of the general class described characterized by structural simplicity and compactness, durability and especially by improved performance and reliability. The term hydraulic as applied to the controller of the invention is intended to embrace any otherwise suitable operating fluid such that the change in its specific volume arising from changes in the pressure to which it is subjected within the controller does not give rise to inadequate performance of the controller.

These and other novel principles and features of the invention, various of which are susceptible of uses other than in the combination and arrangement as herein disclosed and present inventive substance in and of themselves, will be apparent from the following description in connection with the accompanying drawings and by reference to the appended claims.

In the drawings, which will be understood as representing but one illustrative embodiment of the invention and whereby the methods thereof may be practiced:

Fig. 1 is a side elevation of a typical controller or control unit as a whole;

Fig. 2 is a longitudinal section through the controller of Fig. 1, upon double the scale of the latter, and as if on line 2—2 of Fig. 3 except that the upper portion of the pilot-piston is shown in elevation;

Fig. 3 is a top plan of the controller, on the scale of Fig. 2;

Fig. 4 is a partial longitudinal section corresponding to the upper portion of Fig. 2, as on the line 4—4 of Fig. 3;

Fig. 5 is a cross-section as through in the transverse plane indicated by the line 5—5 of Fig. 2, but with the parts in a different operating position, as later noted;

Figs. 6 and 7 are enlarged detail views in plan and cross-section respectively of a bearing means associated with the control pilot member;

Figs. 8 and 9 are views corresponding to a portion of Fig. 2, showing modifications;

Fig. 10 is a schematic representation of systems incorporating the controller of the invention; and Figs. 11 and 12 are side and end elevations of one modified form of pilot member, and Fig. 11a is an enlarged detail view corresponding to a portion of Fig. 11.

Referring to the drawings in more detail, the controller or control unit as there shown comprises a containing frame or housing indicated generally at 6, adapted for mounting at any desired location, and shown as of elongated cylindrical form but which may be otherwise shaped and proportioned. Primarily to eliminate performance inaccuracies, and for convenience in manufacture and assembly the frame 6 may comprise a plurality of sections, all of which preferably are machined and aligned in assembly upon a common axis. These sections herein include an upper end or head 7, and an intermediate section 8, followed by a plate 9. The latter, preferably of dielectric material, seats against one end of a central tubular section 10, the other end of which adjoins a support or bracket plate 11 received against a lower end section or base 12. The number of sections may vary, and one or more of those here shown as separable may be constructed integrally with another or others, as for example, parts 7 and 8 or 8 and 9. The several frame sections are intersecured in their assembled conditions as in Figs. 1 and 2, in pressure-tight relation, as by longitudinal screws 13 one of which is seen in Fig. 2 and others in Figs. 4 and 5. These assembly screws may conveniently have one end tapped into the base 12, their other ends receiving lock washers and tightener nuts 13a desirably countersunk into the head 7. The latter, in addition to constituting one end closure for the controller frame also herein presents main components of what is hereinafter referred to as the governing head, which accordingly may be regarded as designated generally by the numeral 7.

Disposed coaxially in the frame 6 is a longitudinally displaceable output element, power piston or shaft indicated generally at 15. It may be formed in two or more sections suitably joined, and is of a general hollow tubular form, extending centrally through a major portion of the chambered frame, herein from the base 12 to and into the section 8 adjacent the head 7. It includes lower and upper tubular shaft portions 16 and 17. The lower shaft portion 16 extends through the base 12 wherein suitable packing means 12x is provided.

Said shaft portion 16 of the output element 15 is thus operatively available externally of the controller frame. It is adapted for connection, as by a socket 16a, directly or indirectly to an element to be controlled, as for example (see Fig. 10), to an adjusting element of a variable speed hydraulic transmission or other power-transmitting means associated with a body or apparatus whose movement or status is to be directed. No limitation is here intended as to the use of the means of the invention, and it will be apparent from the disclosure herein that the output power may be variously applied for control purposes in general. To mention but one further example within the wide range of uses, the output power of the element 15 may actuate a valve or other adjustable body and which may either represent the ultimate subject of control or may be an element of a larger system.

In Fig. 2 the output element or power piston 15 is shown in a central position with reference to its range of movement. Intermediate its ends, herein about centrally between them, it carries opposed radially projecting piston members 18 and 19, which may be referred to respectively as the lower or outer and the upper or inner piston means of the output element or piston as a whole. It will be understood that positional terms such as "upper," "lower," "top," "bottom," "vertical," "horizontal," "head," "base," and the like wherever they appear herein are used for convenience in identification and description and not by way of limitation as to any particular operational position or manner of installation of the control unit.

The plate members 9 and 11 of the frame present transverse partitions therein, providing between them an operating chamber designated as a whole by the numeral 25 and in which the output piston 15 and its piston members 18, 19 are displaceable in one and the opposite direction. These partitions serve as abutments for the power-piston members 18 and 19, to determine the displacement limits. Said piston members 18 and 19 are longitudinally connected in spaced relation by an annulus or barrel 15x defining a mid-length bore portion for the output piston as a whole and together with said members 18, 19 providing a piston head element having opposed piston faces at its respective ends, one facing each end of the operating chamber 25. Outwardly of the partitions 9 and 11 the frame defines lower and upper end chambers 20 and 21, respectively surrounding the hollow shaft portions 16, 17 of the power piston and communicating with the interior thereof. These end chambers 20, 21 are adapted to receive hydraulic fluid at appropriate inlet or supply pressure and accordingly may be referred to as inlet chambers or supply-pressure chambers.

Such supply-pressure fluid is admitted to the control unit at an inlet port 22 at a convenient point on the frame wall, herein in the upper section 8; see also Fig. 1. Fluid at what I will term "exhaust" or "outlet" pressure is discharged from the unit, in the course of control operations, at an outlet port in the frame wall longitudinally spaced from the inlet and herein shown as at about midlength of the central frame section 10, as at 23; again see also Fig. 1.

As previously noted, the output element 15 appears in Fig. 2 with its piston members 18, 19 in central longitudinal position within the operating chamber 25. The latter comprises similar chamber portions 26, 27 at the opposite sides of the piston members 18, 19. These chamber portions 26, 27 and the operating chamber 25 as a whole are occupied by hydraulic fluid at what I will term "operating" pressure, such fluid coming initially from that received by the end chambers 20, 21 at inlet or supply pressure. In the course of operation of the device, fluid previously at operating pressure in one or the other of the chamber portions 26, 27 is discharged for escape at exhaust pressure at the outlet port 23. The appropriate fluid pressures, for the supply fluid and consequently that at operating pressure are determined primarily by the load on the output shaft 15.

The lower and upper supply-pressure chambers 20, 21 are interconnected by one or more longitudinal passages or ducts 28, one of which is seen at the right in Fig. 2, three being indicated in Fig. 5. These are herein formed mainly in the annular wall of the central frame section 10, and terminally in the plate or partition sections 9 and 11. Fluid at supply pressure is thereby distributed to both end chambers 20, 21 and around and into the respective hollow shaft portions 16, 17 of the output element 15. Herein access for this supply-pressure fluid to the upper shaft portion 17 is had directly at its open end, while at the lower shaft portion 16 one or more radial ports of which two are herein indicated at 29, 29, Fig. 2, are provided for the like purpose.

It is appropriate here to note, as will be further apparent from the following description, that in accordance with the invention necessary transmission of force or displacement between mechanical elements is accomplished substantially throughout by employing a hydraulic medium of transmission, not only for the application of power onto the output element 15, but also as between various other elements to be described, including the pilot piston valve 30 and sources of force associated with it; see for example members 70 and 37, Fig. 4, also 57 and 37, Fig. 2. By thus availing of hydraulic transmission numerous difficulties are obviated, including those of alignment, friction, backlash, wear, bulky design and others commonly attendant on other means of transmission, such for example as mechanical interconnection involving links and pivots. Thus, especially in view of the compactness and simplicity of the illustrated means, substantial advantage is taken of the laws of hydraulics and especially of the positive action obtainable by reason of the rigid performance consequent on the low compressibility of the hydraulic fluid, and of the fact that a hydraulic link is inherently devoid of binding due to misalignment or misfit, and is devoid of wear, of Coulomb friction, and of backlash, these considerations being particularly pertinent to precision control as here concerned.

Referring again to Fig. 2, the fluid at supply pressure in one of the end chambers 20 or 21 and in the adjacent hollow shaft portion 16 or 17 of the power piston is afforded communication at certain times, as determined by input signals, with the corresponding end portion 26 or 27 of the operating chamber, and the other operating chamber portion 27 or 26 is at the same time placed in communication with the outlet 23 for discharge of fluid thereto at exhaust pressure.

For this purpose the power output element 15 has one or more radial passages or ducts 18a in its piston member 18, and similar passages 19a associated with its piston member 19. As shown, a plurality of such passages are employed, extending from the respective chamber portions 26 and 27 inwardly toward the piston bore where they open into annular channels 18b and 19b respectively. Thus the entrance and exit of hydraulic fluid with respect to the operating chamber portions 26 and 27 is herein through the power piston itself. This fluid action is determined by signal-responsive valve means to be described.

It will be understood that for any given power-piston movement the two operating chamber portions 26 and 27 function oppositely with respect to each other. That is, for power-piston movement in one direction, say downward in Fig. 2, the upper chamber 27 receives supply-pressure fluid which acts with the fluid in said chamber, at operating pressure, thereby to move the piston down, while at the same time the other or lower chamber 26 discharges to a then communicating space for fluid at exhaust pressure and thence to the outlet port 23. For power-piston actuation in the opposite direction, upward in the assumed example, said chambers function reversely, fluid at supply pressure being admitted to the lower chamber 26 and fluid being discharged from the upper chamber 27.

The containing space for fluid at exhaust pressure, in constant communication with the outlet port 23, is herein disposed at the mid-length portion of the power-piston, between its piston members 18, 19. It comprises the central piston bore at the barrel 15$x$, including radial branches 15$a$ opening into an annular space 15$b$ between the piston and the frame wall, in the region of the outlet port 23.

It will be noted that with the construction and arrangement of the inlet 22 and outlet 23 as illustrated, in relation to the various fluid passages, any necessity for cross-channelling of fluid is avoided and the space which would be occupied by such crossing passages is made available for other purposes, thus contributing to compactness and decreasing fluid flow resistance attendant on longer passages. In other words, the inlet fluid is admitted by the ducts directly to that side of the piston at which it is to operate, to drive the output piston in the desired direction. It will be understood however that within the invention the inlet and outlet positions may be reversed, and the lower annular channel 18$b$ made to communicate with the upper end chamber 27 while the upper annular channel 19$b$ is given communication with the lower end chamber 26. In this connection, referring again to the embodiment illustrated, the limits of travel of the power piston 15 are such that as to prevent port 23 from communicating directly with chambers 26 or 27, separation being accomplished by a peripheral rim or skirt-like formation at the end faces of the power piston, as at 18$x$ and 19$x$, Fig. 2.

Through the medium of an electrical to mechanical signal converter and associated valve means to be described, the fluid action at conduits including the piston passages and channels 18$a$, 18$b$, 19$a$, 19$b$ is operatively controlled to afford the appropriate power-piston movement or displacement, from central position to the limit of such movement in either direction. These fluid conduits are adapted to be fully closed or shut off with respect to the piston bore, except for a small amount of clearance introduced for purposes of reducing friction as will be seen later, and are so represented in Fig. 2, with some exaggeration for the purposes of illustration; or they may be opened, to a greater or less degree, and placed in communication with one or another portion of the power-piston bore, in accordance with the extent and direction of power-piston displacement called for by the input signal.

The means as herein illustrated for thus controlling the fluid action and power application thereby comprises what I herein term a pilot element, otherwise described as an electro-magnetically responsive hydraulic valving means. Since in the illustrated embodiment such element is of a piston-like form, it may in general be referred to as the pilot-piston valve, indicated as a whole by the numeral 30. It comprises an elongated cylindrical body member having an outer diameter somewhat less than the bore diameter of the power-piston 15. This pilot-piston valve body includes lower and upper portions 31 and 32, at least one of which, the lower portion 31 shown in section in Fig. 2, is formed as a closed hollow tube. The structure of the pilot-piston valve body is later considered in more detail in connection with the electro-magnetic means associated with it. It is sufficient here to note that the average density of the pilot-piston valve as a whole is calculated to equal or closely approximate the density of the hydraulic fluid which completely surrounds it; that is, the weight of this pilot element 30 and of the displaced liquid are equal or approximately so. Accordingly this pilot element has what I herein term zero buoyancy, and approaches as nearly as practicable to that optimum condition, with resultant inherent stability with respect to the enveloping fluid.

On each of the lower and upper portions 31 and 32 of the pilot piston valve are two longitudinally spaced circumferential series of channels or groove-like ports 31$a$, 31$b$, and 32$a$, 32$b$. The spacing between the adjacent ends of the ports 31$a$ and 31$b$ of the lower piston portion 31, and similarly between the ports 32$a$ and 32$b$ of the upper portion 32, is such as there to present closure zones or annular valve faces effectively to cover and close the corresponding annular channels 18$b$ and 19$b$ when the pilot piston valve is centrally positioned lengthwise of the power piston 15, as shown in Fig. 2. The ports of each series 31$a$, 31$b$, 32$a$, 32$b$ are spaced around the pilot piston valve wall, in any appropriate number to give a total port area desired, and may be circumferentially connected or formed to present continuous annular ports, for example as in the modification of Figs. 11 and 12 where corresponding parts have like numerals with a zero or prime added.

The shape and dimensions of these ports, radially, axially and circumferentially of the pilot element, are selected to afford an action of opening, and of reverse closure, the rate and the extent of which are predeterminedly related and proportioned to the rate and extent of displacement of said pilot element, which in turn is dependent primarily on the strength and the duration of the motivating input signals. In some applications, for example, it may be desirable that an initial relatively small displacement of the pilot piston valve from port-closing position shall effect an initial relatively large port opening, and that further displacement shall give decreasing increments of additional port opening, or shall merely maintain the same opening or even decrease the total opening; in other words, a large quick initial opening followed by an increase, a maintenance or a decrease of the total opening, at either a uniform or a varying rate. In other applications a relatively slow or comparatively small initial opening may be desirable, followed by additional opening at a progressive rate, increasing or decreasing, or at a uniform rate. All these requirements may be satisfied by shaping and dimensioning the ports accordingly, as for example with more or less taper in one or the other direction, and with a selected angular relation or slope as between the port walls and the cylindrical surface of the pilot-piston body. Desirably, as shown in Fig. 2, also Figs. 8 and 9, the port walls, particularly their end walls, approach said outside cylindrical surface at substantially right angles. In this connection see also Fig. 11a showing a right-angular port-edge formation which may be employed in connection with the pilot ports of any of the figures. The rounded-end, in-sloping, medially uniform, trough-like port formation as illustrated, represents a construction found well suited to the generality of applications; again see Figs. 11 and 12 for a modified construction with annular ports 310a', 310b', 320a', 320b' and annular valve-face zones 310x, 320x, with or without the rectangular edge formation as at 300R of Fig. 11a. Said port edge construction relieves any tendency for accumulation or wedging of small foreign particles at the fluid closing-off point, similarly as referred to in a subsequent paragraph with reference to the port land 18c, 19c, combining this advantage with that of throttling as had in association with the sloping port walls adjoining said edge recessing 300R.

In operation, by way of example, down displacement of the pilot piston valve 30 relative to the power piston 15 in Fig. 2, however limited in extent, will place the annular channel 18a in communication with the piston valve port 31b and through the latter with the radial passage 15a for fluid at exhaust pressure. Under the same pilot-piston valve down displacement the ports 32a at its upper end establish communication with the annular channel 19b and its radial passages 19a, thus admitting fluid at operating pressure from the upper end chamber 21 to the operating chamber portion 27 where it is effective downwardly upon the upper piston element 19 of the power piston 15, further to project the latter downwardly in Fig. 2.

It is here particularly noted that the directive or signal-responsive displacement of the pilot element 30, with reference to its port-closing or neutral central position, is in the same direction as the resultant movement of the power piston 15, both downward in the assumed instance. Similarly, on up displacement of the pilot piston valve, the power piston is moved upward. At such time, fluid at operating pressure is admitted via pilot-piston valve ports 31a to the lower operating chamber 26, while fluid is discharged at exhaust pressure from the upper operating chamber 27 through the ports 32b.

Movement of the power piston 15, in whichever direction, continues within the capacity of the controller to overcome whatever load is imposed on its output, so long as the corresponding pilot-piston valve ports are open, to whatever extent; that is, so long as the pilot piston valve is displaced from its central Fig. 2 position relative to the power piston. Such pilot-piston valve displacement is maintained, except for auxiliary influences later to be described, so long as the low-power electrical input signal, also to be described, persists. Accordingly the power-piston movement continues until said signal effective on the pilot piston valve becomes zero, still excepting auxiliary influences, and the pilot piston valve assumes its central or port-closing position, or until the limit of the power piston stroke is reached. Whenever said input signal becomes zero, the pilot piston valve 30 assumes its central or port-closing position, relative to the power piston 15, as in Fig. 2, with the exceptions already noted.

When the pilot piston valve 30 attains its port-closing position as above, the power piston 15 stops in whatever position it has then arrived, and awaits a change in input signal effective to move the pilot element 30 in one or the other direction. That is, the power output element 15 does not seek to return to some predetermined neutral reference position for said element, under zero input signal conditions. Otherwise stated, the zero reference or no-motion reference for the power output element 15 is not any given position thereof relative to the control frame or mount, but its said reference is zero input signal.

Numerous advantages result from or are attendant on this avoidance of a positional zero reference for the power piston and for the piston unit as a whole, making for improved sensitivity and accuracy. One of those advantages is that irrespective of the position of the power piston, i. e. the output status of the controller, in the vicinity of zero input signal (which vicinity covers the range of critical operation of the controller) the operating parts of the controller have the same mechanical condition relative to each other, unvaried by any different mechanical stress displacement or interrelation effect on or in them at different power-piston positions, since only their hydraulic linkage status is modified under different power-piston positions. This means that the sensitivity of the controller or its response to any given input, i. e. change in input signal, tends to be the same regardless of the controller output, i. e. the position of the power piston. If on the contrary, the controller was designed so that different positions of the output element were associated with different deflections of springs and different angular positions of levers determining the sensitivity of response of the pilot piston, then it is unlikely that this sensitivity would be independent of power-piston position (that is, controller output).

With the novel structure and principle of operation as here disclosed, wherein the pilot element has a zero, normal or port-closing position with direct reference to the output element and regardless of the instant operative position of the latter, the controller of the invention tends to have the same sensitivity, responsiveness and precision of operation over its full range of output. Hence with the parts constructed and arranged for optimum performance for one output condition or position of the output element, the same or substantially similar optimum performance may be had over the full range of operation of the apparatus. The invention will be understood as comprising within its broad scope any equivalent controller structure and similar operating method, whether the advantages inherent therein are fully availed of, or are but partly utilized, or the structure or method is modified by omitting, adding or altering parts.

It will be understood that the reduction or elimination of friction is an important consideration in a control as here concerned, particularly with respect to parts which operate at a relatively low power level, such as the pilot piston valve and certain associated parts. Hence as an important feature of the invention it will be observed that the peripheral wall of the pilot piston valve 30 throughout its entire length is radially spaced to an appreciable extent from any surrounding portion of the power piston 15, and that even at the porting regions adjacent the annular channels 18b, 19b a certain minimum approach is maintained as between relatively moving surfaces, as by there providing the annular lands 18c, 19c, of extremely limited area. The diameter of these lands and that of the non-ported areas of the pilot piston valve is such as to afford a mechanical clearance, and maintenance of an intermediate fluid film. Thus friction effects are reduced. Other features contributing to friction elimination will be referred to, including the provision of certain low-friction bearings for the hydraulic-valving pilot element 30 which are independent of the valve ports, which latter in general are inherently unsuited to low-friction bearing design. Further, the port face clearance associated with the lands 18c, 19c is in excess of the clearance as between the journals and supports of the independent bearing means mentioned. Thus the independent bearings serve to center the pilot piston valve body within the port lands, assuring surface to surface clearance at all points on the valve faces. Moreover the relief of the port lands and their limited area reduces possibility for contact between port faces by reason of cocking of the pilot piston valve under misalignment from whatever cause. In this connection it should also be noted that the provision of annular port approaches as at 18b, 19b makes for hydraulic balance. It will also be observed, as to the port lands 18c, 19c that their faces and sides form sharp edges between them and merge at an abrupt angle close to a right angle, thus aiding to scrape away any small foreign particles which might otherwise tend to wedge between the lands and the pilot piston valve and produce friction or binding. These lands in the exemplary embodiment of Fig. 2 are formed as pairs of annular projections at the inner faces of sleeve members concentrically fitted to the axially aligned bores of the power-piston head and shaft portions. Radial apertures in these sleeves at the zones between the lands of each pair 18c and 19c communicate with the respective annular channels 18b and 19b, while the lands of each pair define between them the inner terminal entrance and exit ports to and from said channels, for cooperation with the closure zones or valve faces of the pilot piston valve (spaced radially from the lands) and with the described piston ports 31a, 31b and 32a, 32b respectively.

It will further be noted with reference to Fig. 2 that the working fluid, at operating pressure from chambers 26 or 27, is applied in a manner tending to compress the pilot piston valve between port lands, thereby avoiding the necessity of crossing of operating fluids supply channels to attain the required directional response of the power piston, i. e. response in the direction of displacement of the pilot piston valve with reference to its shut-off position. The elimination of cross-channeling results in the saving of space and makes the same available for other purposes.

From the foregoing it is evident that displacement of the pilot piston valve 30 in and relative to the power-output element 15, in one or the opposite direction from neutral position, results in movement of the latter, herein in the same direction. The relative displacement of the pilot piston valve in the appropriate direction is responsive to and under the control of a directive input signal already referred to.

The source of such input signal and the information which it represents may vary widely with the fields of use of the control device and system of the invention. In most instances the signal may be regarded as an expression of what I herein term error, meaning thereby a deviation in the action or status of the thing to be continuously controlled, from what is desired or directed for it at any given instant.

In applications of the invention in servo-loops, for example, the input signal may be representative of the existence of some error however large or small between an intended status of the subject to be controlled as derived from a director instrumentality and the actual status of that subject, as for instance, a fire-control director instrumentality and a gun mount to be directed. In such case, ordering intelligence from the director instrumentality is delivered to an intermediate error-measuring device or station, the latter also receiving and coordinating performance intelligence from the gun mount and in effect compiling them into a signal representative of any error or discrepancy between the two intelligences; see Fig. 10.

Such error signal may be plus or minus, positive or negative, depending on the direction of deviation from the directed performance. The amplitude of the error determines the magnitude of the signal, and the latter in turn primarily determines the extent of pilot-piston valve displacement. If performance is exact, with error at zero, there is a zero error signal. It is in connection with such error signals, plus, minus or zero, that the control of the present invention is especially, although not exclusively, applicable.

Within the invention the input or directing signals may be variously applied to the primary element, the element which primarily motivates the pilot piston valve. Generally such signals are electrical, and they may be of an extremely low order as to power magnitude. Hence in the illustrated embodiment of the invention provision is made for receiving such electrical signal and converting or translating it into a low-power pilot-element displacement and consequently into a higher-power mechanical output signal, herein represented by the axial movement of the piston-shaft output element 15. The energy by which the power level is raised is derived from the hydraulic fluid supplied to the controller under pressure. Thus it is seen that the device embodies the power-level-increasing characteristics of a power amplifier; it may be regarded and utilized as such, either alternatively to or in addition to its control functions. The admission of this fluid to operation upon the output element is determined by the conversion of the low-power electrical input signal into the low-power displacement of the described pilot element or hydraulic valve 30.

Such conversion of the electrical input or error signal is effected by electro-magnetic means incorporated jointly with the power piston 15 and with the pilot piston valve 30 disposed in the latter. Hence this converter means, exclusive of electrical connections leading to and from it, is in its entirety on and carried with the plural piston unit 15, 30 as a whole. Said means is adapted to produce displacement of the pilot piston valve in one or the opposite direction according to the direction or character of the error as represented by the polarity or other differentiation of the input signal.

Referring again to Fig. 2, such converter means in the exemplary embodiment there shown comprises a solenoid 40 disposed in the power piston 15, within the barrel 15x which extends longitudinally between the lower and upper power piston members 18, 19. This solenoid is centrally hollow and surrounds the bore of the power piston, in which the pilot element 30 is disposed. The lower portion 31 of the pilot piston valve 30 in this instance is of hollow tubular form to promote buoyancy and the opposite ends are of equal area for hydraulic balance, while the upper portion 32 is formed in major part as a more or less solid body of efficient permanent-magnet material. It is united with the lower tubular portion, sealing the latter, as by means of a reduced neck received therein, the two pilot piston valve parts being joined to present a generally uniform cylindrical external wall presenting the port formations 31a, 31b, 32a, 32b, previously described.

The remainder of the magnetic circuit of which said upper pilot-piston portion 32 is a central part, includes the power-piston heads 19 and 18 and the power-piston barrel 15x between them, all of which members desirably are made of low hysteresis, high-permeability magnetic material, and may be designed for low eddy-current loss. The permanent magnet portion 32 of the pilot piston valve is offset axially relative to the mid-length region of the solenoid 40. Thus the direction of displacement of the pilot piston valve 30 in and relative to the power piston 15 is made to depend on the polarity or positive-negative characteristic of the received electrical signals, the resultant pilot-piston valve motion in the magnetic field being in the direction of decreasing potential energy.

In Figs. 8 and 9, later described in further detail, certain alternative constructions and arrangements for the signal converter means associated with the power and pilot piston valve elements 15 and 30 are illustrated. In one of these, Fig. 8, the arrangement as to the electrically energized solenoid and the permanent magnet element is the reverse of that of Fig. 2, in the sense that the solenoid is incorporated in the pilot piston valve 30, while the permanent magnet means is entirely on the power piston 15. The constructions of Fig. 2 and Fig. 8 are suitable for applications where direct current is available for the directive error or input signals, the Fig. 8 form, as compared with Fig. 2, having certain advantages, to be pointed out later. In the other modification, Fig. 9, the converter means comprises separately energized solenoids, one directly on the power piston substantially as in Fig. 2, and the other on the pilot piston valve in a generally similar manner as Fig. 8. Said Fig. 9 embodiment is universally adapted for use either with alternating or with direct current for the input signals.

Returning to Figs. 1, 2 and 3, the error or other directive electrical input signal is received by the solenoid 40 through a circuit including sliding contact means. In Figs. 1 and 3, two pairs of conductor terminals are indicated, of which one pair 41, 42 is for the input signal. From one terminal 41 or 42 (41 as shown), the circuit extends to an upper contact sleeve 43 supported on insulating means 43a at the end wall of the upper end chamber 21. The sleeve 43 has at its inner face a contact element 43b making substantially a linear circumferential contact with the adjacent upper shaft portion 17 of the power piston. The latter may have an outer layer or sleeve of silver or other readily conductive material is indicated at 17b, preferably over an insulating sleeve 17c.

Said conductive surface portion 17b of the power-piston shaft is connected by a lead 40a to the solenoid 40, from which a further lead 40b connects to a conductor sleeve 16b on the lower shaft portion 16. The latter in turn has sliding electrical connection with a lower contact sleeve 44 mounted in the lower end chamber 20 as by means of a plate or spider 45 held by the frame and having a series of apertures 45a for through passage of the hydraulic fluid. From the lower contact sleeve 44 a conductor 46 extends in any convenient manner, as through one of the longitudinal passages 28, back to the other of the terminals 41, 42, herein the terminal 42 as indicated at the right portion of the upper end chamber 21. Optionally the contact sleeve 16b may be insulated from the shaft portion 16, the contactor 44 insulated in its mounting, and the lead 46 may be insulated. The electric circuits, both in the Fig. 2 embodiment and those of Figs. 8 and 9, may be arranged otherwise than as shown, in any manner preferred or found convenient to the purposes stated; for example, the number of leads and external connections may be reduced by grounding one side of one or more circuits onto the frame, housing or containing body 6 of the controller.

Referring again to the pilot piston valve 30, this element as before stated desirably is balanced at substantially zero buoyancy, as by matching its average density to that of the hydraulic fluid, the hollow lower portion here assisting to that end. In the illustrated construction said pilot piston valve is constrained in and with respect to the power piston, in such manner that the motion of the latter is induced in the pilot piston valve. That is, the fluid-actuated higher-power output motion of the power piston is superposed on the signalled motion of the pilot piston valve relative to the power piston which occurs in response to the electrical input signal magnetically converted by the solenoid. Further influencing factors which determine the ultimate motion of the pilot piston valve 30 include the action of the governing head, as later described. The superposed motion here referred to is accomplished herein by opposed and balanced yieldable or elastic means, at the opposite ends of the pilot piston valve 30, acting between it and the power piston 15.

Accordingly the pilot piston valve 30 has at its ends axial stems 33 and 34, of substantially reduced diameter and integrally or otherwise connected respectively to the opposed ends of the pilot-piston valve body 31, 32. Surrounding the stems are compression springs 35 and 36 respectively, of similar formation and capacity. The spring 35 associated with the lower stem 33 bears at one end against a shouldered collar 33a secured to the stem, and at its other end against a bearing support 16x (see also Figs. 6 and 7) having peripheral supported engagement with the lower shaft portion 16. For convenience in construction and assembly the latter may be formed with removable internal components as represented in Fig. 2. One of these components, a sleeve nearer the center of the device, herein carries the port lands 18c previously described. Said bearing support 16x has a series of apertures, 16x', Figs. 6 and 7, disposed about the piston valve stem, for passage of the hydraulic fluid at supply pressure. It is shown as carried on a collar 16x'', Fig. 7, constituting another internal component of the lower power-piston shaft portion 16, coaxially seated in a shouldered recess in the bore thereof.

In a similar manner the spring 36 associated with the upper stem 34 bears at its inner end against a perforate support 17x carried by the upper shaft portion 17 of the power piston, here also internal components such as sleeves desirably being provided for positioning said support and for presenting the port lands 19c. At its upper end the spring 36 is received on and bears axially against a positioning member 34a carried by or forming a part of a stem extension 37, of somewhat larger diameter than the stem 34.

This upper stem extension 37 constitutes a dashpot piston, the functions of which will be referred to later. It is here shown as a separable member having the outer end of the stem 34 set into it coaxially and pinned or otherwise fastened to it. It desirably is hollow at least along a substantial portion of its length as indicated at 37a and is closed and sealed at its upper end or piston head 37b. Thus this piston extension is adapted to aid in buoying the pilot piston valve as a whole.

The described springs 35, 36 interposed between the pilot piston valve and power piston function in balanced opposition, to induce the pilot piston valve 30 toward its midway port-closing or neutral position relative to the power piston 15. Under signalled movement of the pilot piston valve in one direction, for instance downward, in Fig. 2, the upper spring 36 is at first subject to compression while the lower spring 35 is correspondingly relieved, the reverse taking place under pilot piston valve movement in the other or up direction. As previously mentioned, the resultant hydraulically-effected motion of the power piston is induced on the pilot piston valve and superposed on its signalled movement, subject to such modification or correction as may be afforded by certain means associated with the governing head to be described. Said spring means 35, 36, while not essential in all applications, assist in effecting said induced and superposed motion for the pilot element 30, and in urging the latter toward its midway position illustrated in Fig. 2, as well as promoting correct response by the controller as a whole.

Further advantages are gained through the provision of the opposed balanced spring members 35, 36. Each may be expected to undergo physical change in aging, but generally in the same manner and to the same extent. Since the springs function oppositely, the aging effects are balanced out. Further, by utilizing opposed spring elements, and appropriately constructing and arranging their supporting parts, both springs may be installed under an initial compression so selected that in their maximum extended positions the compression is never wholly relieved. Hence there is no reversal of stress in the spring structure at any time. Consequently changes in spring character through aging may be expected to be small and materially delayed, while such changes as do take place are balanced out as above explained.

The function of the springs 35, 36 in inducing the motion of the power or output piston 15 onto the pilot piston valve 30 has been pointed out. From what has been said it will further be apparent that these springs also serve to cause the extent of pilot piston valve displacement and hence the extent of port opening, to maintain a desired relation to the strength of the input signal, said displacement being less under a weak signal, and more under a stronger one. The signals as here referred to are assumed, for the purposes of this exposition, as being sustained, that is, persisting for such period that the function of the governing head, to be described, and which is concerned with time characteristics, is not a factor required to be considered in describing the effect of the springs themselves.

It will be observed that the bearing supports 16x, 17x define the only locations at which the pilot piston valve including any extension thereof has in a radial direction any bearing or support of a mechanical nature (as contrasted with fluid or hydraulic support) in or with respect to the power output piston 15 within which it is carried, or with respect to any other part. However, one advantage attendant on the compact and simplified single-axis structure for the several piston parts and the converter frame as herein illustrated is that a mechanical tie-in as between the pilot piston valve and the frame 6 may readily be installed should that be felt desirable in any instance, as by inserting spring or other mechanical linkage between the stem extension 37 and the frame head 7.

Further with respect to the generally compact and simplified controller structure as illustrated, it is also appropriate here to note as an important feature that the invention totally avoids any necessity for feed-back of the motion of the output element (the power piston-shaft 15) either to the pilot element (piston valve 30) or to the electrical to mechanical signal converter (solenoid 40). One factor contributing to the elimination of such feed-back is the carrying of the primary signal-receiving element (the electrical to mechanical converter means such as 40) with the output element 15, while the pilot element 30 (also carried with the latter) has a "neutral" or "zero" position only with reference to said output element 15 and not with relation to the frame, mount or other external reference. Further, the combined input, operating and output means considered as a unit (comprising mainly the power piston 15 and the pilot piston valve 30, which together will be referred to as the piston unit or the moving unit) has only a hydraulic coupling to the frame, in the axial or longitudinal direction (the direction of operation). In the transverse direction, both main elements of this piston unit are restrained mechanically. But the pilot element 30, operating at the low-power level, has extensive freedom from coulomb friction effects; that is, coulomb friction on the pilot piston valve 30 appears only at the special anti-friction bearing means 38, 39, etc. now to be described and whereby coulomb friction even at that region is further reduced.

Such novel bearing means is herein associated with the bearing supports 16x and 17x adjacent the respective pilot-piston valve stems 33 and 34. Said means at one of the stems, the lower stem 33, is seen on an enlarged scale in Figs. 6 and 7, the corresponding means at the upper stem 34 being generally similar, with appropriate reverse arrangement.

Referring to said Figs. 6 and 7, as well as Fig. 2, the bearing support 16x, apertured as at 16x', 16x', etc. for fluid passage, has a central through opening to receive the pilot piston valve stem 33. The wall of this opening may itself form the bearing for the pilot piston valve or it may be enlarged as in the figures to receive a bearing insert member 38. Such insert 38 may be variously formed, of metal or other low-friction material. It is firmly fixed in an enlarged shouldered portion of said opening. Its composition desirably is characterized by substantial hardness and capacity to receive a high polish, as for example a precious or semi-precious stone. Such bearing or bearing insert 38 is centrally bored and may be counter-bored as shown to provide an annular bearing proper or collar 39 of reduced axial extent. Its cylindrical inner wall is formed with precision, upon a diameter for bearing contact with the stem 33. Its length axially while reduced is adequate to prevent cocking of the pilot piston valve to any extent such as would permit engagement of the port lands 18c, 19c with the radially spaced valve facing at the peripheral wall of the piston valve body.

Similarly as for the radial and axial faces of the port lands 18c, 19c previously described, the radial and axial faces of the jewel or other bearing collar 39 meet in an abrupt edge formation approaching a right angle. This affords a means for scraping or sweeping away foreign matter instead of allowing it to wedge or cause binding at the journal. Above and below said collar 39 the counter-recessing as at 38a, 38b, gives clearance ample to avoid accumulation of such foreign matter.

As above noted, the bearing surface contact area of the bearing collar 39 is reduced to a minimum consistent with ample alignment for the pilot-piston valve stem 33, yet the body or barrel of the insert 38 is of adequate size and sufficient extent in the axial direction to provide a substantial alignment base, mounting support, and general strength for this bearing element as a whole. The latter is novelly characterized by its service not only as a rotational bearing means but also as a thrust or axial-motion bearing, as to both of which aspects this bearing is such that mechanical drag or coulomb friction effects at this location are made exceedingly small. It is a further feature of importance in this connection and with reference to the improved performance of the pilot element as a whole that no reliance for bearing support is placed on the port or valve faces, the pilot bearings being completely divorced from and independent of said valve faces. Consequently the bearings can be accorded the minimum contact area and other low-friction features as illustrated and above described, not readily attainable if the bearing function were required to be derived from the valve faces, or the valve function from the bearings.

Figs. 8 and 9, illustrating modifications of the electrically responsive primary or signal-receiving and electrical to mechanical converter means, have been referred to briefly. In said Figs. 8 and 9, parts corresponding to those of the earlier figures bear corresponding reference characters with the addition of a zero; parts not otherwise referred to may be regarded as the same as in the earlier figures. The piston unit or moving unit of the control, including the power piston or output element and the pilot piston valve carried with it, is shown in Figs. 8 and 9 without the containing body, case or the like, such as the frame 6 of the preceding figures.

Referring now to Fig. 8, the power piston indicated as a whole at 150, includes lower and upper tubular shaft portions 160, 170 and lower and upper piston head members 180, 190. These latter are connected by a cylindrical barrel 150x, having radial openings 150x' for the passage of fluid at exhaust pressure. The annular space within the barrel 150x, corresponding to the space occupied by the solenoid 40 of Fig. 2, is here open to an extent depending on the selected thickness for the wall of the barrel. Such space is available to fluid at exhaust pressure, in direct communication with the fluid outlet 23 (Fig. 2). The barrel 150x, of permanent-magnet material, is constituted as a permanent magnet surrounding the adjacent portion of the pilot piston 300, the piston heads 180 and 190 also being included in the magnetic circuit associated with said barrel.

In this Fig. 8 embodiment both the upper portion 320 of the pilot piston valve 300 and its lower portion 310 are tubular, closed at their opposite ends and interfitted and sealed at their adjacent inner ends, medially of the pilot piston valve body as a whole. The lower valve ports are indicated at 310a, 310b and the corresponding ports for the upper piston portion at 320a, 320b.

The tubular upper pilot portion 320 in this embodiment houses an elongated solenoid 90 preferably having an iron or other magnetic core, which may have a longitudinal opening for weight reduction or for conductor connections. This solenoid 90 is fixed in the pilot piston valve, as by proportioning it to fit and be held by and between the inner walls of the series of valving ports 320a, 320b. As in the Fig. 2 construction, the solenoid and the permanent magnet elements 90 and 150x are offset in the axial direction so that the pilot piston valve 300 will be caused to move oppositely under input signals of opposite polarity.

The electrical connections for the solenoid 90 may be disposed in any convenient manner consistent with the operation of the piston unit as a whole, which operation in general will be understood as similar to that as in Fig. 2. In Fig. 8, for example, a lead 195 extends inwardly from the contact sleeve 170b of the upper shaft portion 170 of the power piston 150 to the lower end of the upper spring 360, said spring having an insulating plate 96 at its lower end. From the upper end of this spring 360, insulated at 340a from the flanged portion of the pilot-piston valve stem extension 370, a lead 97 extends into the pilot-piston valve stem 340, made tubular for the purpose, and through and sealed in the latter and herein through the solenoid core into communication with one end of the solenoid, the lower end in Fig. 8. The solenoid 90 is tapped centrally or otherwise and connected to one end of a conductor 98 extending down through the lower portion 310 of the pilot piston valve and out through the channeled interior of the lower piston stem 330 to the lower end of the lower spring 350. The upper end of said lower spring 350 is electrically connected by a transverse lead 99 with the outer conductive sleeve 160b of the lower power-piston shaft portion 160. This lower spring 350 may be insulated at its ends as at 100 and 101, similarly as for the upper spring 360. The electrical winding of the solenoid 90 desirably is of low-resistance wire, preferably light in weight, as for example aluminum wire. As noted, the electrical connections may be variously arranged, not only for the Fig. 8 embodiment but also in those of Figs. 2 and 9; for instance, flexible connections or so-called pigtails may be employed instead of slide contacts, at any location of the latter.

Among the advantages in the construction and arrangement of the electrical and magnetic parts as in Fig. 8 are those of compactness and general weight reduction, in view of the space left available to fluid internally of the head and barrel portions of the power piston, and particularly a weight reduction of the pilot piston valve through the substitution of a light-weight solenoid for the permanent magnet portion of Fig. 2. By locating the permanent magnet element externally of the pilot piston valve a stronger permanent magnet field and one less susceptible to demagnetization may be provided, adapted to function uniformly over an indefinite period. Consequently the electrical signals imposed on the solenoids may be of an extremely low order of energy, these several factors all making for operative sensitivity in the device as a whole.

Turning now to Fig. 9, the modification as there shown employs electrically responsive elements such as solenoids both for the power piston and for the pilot piston valve, dispensing entirely with permanent magnet means such as that either of Fig. 2 or of Fig. 8. In Fig. 9, a solenoid 40 is incorporated in the barrel portion 15x of the power piston, which, together with its electrical connections may be substantially as shown and described in connection with Fig. 2. Carried with the pilot piston valve is a solenoid 90 which may be generally similar as in Fig. 8. One of the solenoids 90 or 40 of Fig. 9 is made the prime receiver of the error or other input signal energy, the other being excited by a separate source of electrical energy, desirably of the same frequency in the case of use of alternating current; preferably the relatively low-power input signals are applied to the smaller solenoid, that on the pilot element, while the larger solenoid receives the separate and permissibly higher-power electric energy, thus taking advantage of the relative proportioning of the solenoids for optimum pilot-element-displacing force.

Accordingly in Fig. 9 another conductor lead is provided, in addition to the two pairs shown in Figs. 1 and 3. In the Fig. 9 example the pilot-carried inner solenoid 90 is placed in the input signal circuit, while the outer or power-piston-carried solenoid 40, which may be relatively larger and stronger, has its own circuit. Said latter circuit may be as illustrated in Fig. 2, including the external contact sleeves 16b and 170b on the power-piston portions 16 and 170, the co-operating external slide contacts 43, 44 and the electrical connections as described in connection with said Fig. 2.

The electrical input (error) signals are applied to the pilot-carried solenoid 90 of Fig. 9 in any convenient manner providing for them a circuit separate from that of the other solenoid (40) (except for a common or grand lead, if employed). For the purpose I have shown in Fig. 9 an additional annular slide contact member 110 internally disposed at one end of the piston assembly (the upper end in Fig. 9). It is supported in insulated relation to the frame or housing, as by attachment at its upper end to the insulating ring 43a (Fig. 2), so that the latter also insulates this internal slide contact 110 from the external contactor 43. The power piston shaft portion 170 has at its upper inner wall a silver or other conductive sleeve 111 over insulation 112, the internal contactor 110 having sliding contact at its lower end with said sleeve 111. From the latter an electrical connection 113 extends to the lower end of the spring 360 (insulated as in Fig. 8), while an insulated conductor as at 114 extends from the upper end of the spring into the pilot stem 340 and thence to the solenoid 90 within the upper pilot portion 320, generally as in Fig. 8. From said pilot solenoid 90 a lower lead 115 extends out through the lower pilot stem 330 onto the spring 350, and from the upper end of said spring the circuit is grounded to the power shaft portion 16 as at 117.

Where the pilot stems or either of them are axially bored, as in Figs. 8 and 9, their ends or other portions at which conductors enter are sealed against entrance of fluid. It will be understood that any of the constructions and arrangements of the signal-converter means as described and illustrated in any of Figs. 2, 8 and 9 by way of examples may be employed in combination with any of the other modifications, such as those of Figs 11, 11a and 12 with reference to the pilot ports, or the particular form of anti-friction bearings, etc. As noted at an earlier point, the number of electric leads and terminals may be reduced, in any instance, by grounding one side of the particular circuit, or independent circuits may be used throughout, as through the medium of pigtails and suitable means such as stops preventing excessive rotation of the piston unit.

The present invention further contemplates other correlated means for governing the motion and displacement of the pilot element or piston valve 30, with the objects of anticipating and compensating for errors, further stabilizing the control, and also additionally reducing friction effects with respect to the low-power operation of the pilot piston valve. Such means in the illustrated example is embodied in what I have previously referred to as the governing head, herein incorporated in the upper end section or head 7 of the frame or housing of the device as a whole, as seen in Figs. 2 and 4.

Referring to the upper portion of Fig. 2, the pilot piston valve stem extension 37 projects centrally into a tubular and preferably cylindrical chamber 50 concentrically formed in the head 7. This chamber 50 is of a diameter and length to present a volume of fluid enveloping the free end portion of the stem extension 37, and together with the latter and an orifice next to be described provides a damping means in the general nature of a dashpot.

At its lower end this dashpot chamber 50 is in effect partially isolated or partitioned off by an orifice member on or secured to the head 7, as by a separable plate 7a fixed thereto, herein partly within the intermediate section 8 of the frame 6. This plate 7a has in or associated with it a central orifice as at 52, Fig. 2, or 52a, Fig. 4, somewhat larger than the outer diameter of the stem extension 37 and concentric with it, and through which said stem passes, with calculated clearance all around. The clearance constitutes the orifice 52 as a throttling means, with respect to the hydraulic fluid at supply or operating pressure in the adjacent end chamber 21 and to the fluid in the chamber 50 and other connected spaces in the governing head to be referred to. This throttling orifice probably is elongated, as shown in Fig. 4, sufficiently to provide a lamellar flow of the fluid thereat, with attendant calculated drag effect upon the piston-like extension 37. Such elongated orifice or sleeve formation is preferred in instances where it is desirable for the viscous drag to be proportional to the absolute speed of the piston. Otherwise the throttling orifice may be of but brief extent axially of the stem 37a, as for example an opening in a relatively thin plate or web 51 on the plate 7a as in Fig. 2. As to the feature of the throttling orifice Figs. 2 and 4 present two embodiments, Fig. 4 otherwise being a section as if on the line 4—4 of Fig. 3. The stem extension 37 in effect itself constitutes a further piston means associated with the pilot piston valve but under the influence of the segregated fluid within the governing head.

The dashpot chamber 50 is in fluid communication with one or more other chambers, so as to be effectively integral with them. One such chamber is seen at 55 in Fig. 2 to be referred to as the elastic chamber proper or the bellows chamber. The chambers 50 and 55, being hydraulically linked or in communication, may together be regarded as constituting portions of a single elastic chamber. Their partial separation or offsetting, as permitted by their hydraulic relation contributes to compactness (before referred to as an important object of the invention) and facilitates manufacture and assembly of the control, but they may be formed as a common or unpartitioned chamber. The various components including said chambers 50 and 55 and parts therein, that is, the damping means and the elastic reservoir, may for convenience be referred to unitarily as the dashpot.

Said chamber 55 is conveniently of cylindrical form and of a volume to house within it, in spaced relation to its walls, a pressure-variable element 56 herein represented as a hollow expansible and contractible means or bellows, preferably of thin flexible metal. The accordion-like side wall and the outer end wall or diaphragm 57 of the bellows seal off the space within it from the surrounding portion of the chamber 55, which is filled by the governing-head fluid. The lower or inner end of the bellows is open to the hydraulic fluid at supply pressure in the adjacent end chamber 21, via an aperture in the plate 7a and an aligned aperture 59 in a closure disc 58 seated in a recess in the head 7 and providing a bottom wall for the chamber 55. The closure disc 58 has at its upper face a concentric annular groove 58a in which the otherwise open lower end or neck of the bellows 56 is affixed and sealed as at 56a.

The described pressure-variable means or bellows 56 is adapted to expand or contract under pressure differential developed as between the hydraulic fluid at supply pressure and the fluid in the governing head. Any such differential pressure arises primarily from displacing of the pilot piston valve 30 and of its unitary stem extension or auxiliary piston 37 relative to the body of the controller, that is, the absolute displacement of the pilot element as previously defined herein.

The action of the above-described components of the governing head (not including the dither means to be described) during operation is as follows: Upon a displacement of the dashpot piston 37 a pressure differential is set up between the fluid in the governing head and the fluid in the main body of the controller. These two quantities of fluid are in communication with one another through the annular opening 52 or throttling means surrounding the dashpot piston. The pressure differential acts with net force upon the dashpot piston and in addition causes flow of fluid through this opening. The viscous effect of the fluid flowing adjacent to the skirt of the dashpot piston produces a dragging effect or further force on the dashpot piston, which effect or force may be augmented or predeterminedly regulated by appropriately dimensioning the wall of the orifice relative to the piston stem, both in the axial and radial directions. The pressure differential as developed by the displacement of the dashpot piston also acts to compress or extend the bellows 56 of the elastic chamber, and as the pressure differential is relieved through the throttling means the bellows tends to return to its free position. It returns at the rate permitted by the extent of throttling determined by the size of the annular opening 52. That is, the reaction on the dashpot piston due to the pressure differential and the throttling is distributed over a period of time extending well beyond the duration of the piston action which generated the pressure difference.

The dashpot, including the damping means and the elastic reservoir, functions to provide for error anticipation and compensation in the following manner: The damping effect of the fluid displaced by the dashpot piston 37 acts to prevent accumulation of excess kinetic energy by the pilot piston valve 30 which excess energy would lead to the pilot piston valve overtraveling its course for optimum error correction. The elasticity of the reservoir permits the pilot piston valve to respond rapidly to signal influences which rapid response would otherwise be excessively inhibited by the action of the fluid differential pressure against the head of the dashpot piston.

In order that the relatively free displacement of the pilot piston valve, as permitted by the elasticity of the chamber, will not give rise to overtravel of the pilot piston valve as previously mentioned, the construction and arrangement is such that this displacement results in the accumulation (positive or negative) of a quantity of fluid under pressure differential. This pressure differential, as it is relieved through the throttling means at 52, acts on the piston to induce it toward its prior position, as also does the viscous drag of the throttled fluid. As time progresses this dashpot reaction to any piston action dies out. The prior action of the dashpot piston has cumulative and degenerative effect upon the relative position and conformation of the components of the governing head. Accordingly any instantaneous relation of the dashpot elements may be considered to be representative of a summation of the near history of operation of the controller. In general, in physical phenomena, near history may be extrapolated into the near future to predict future performance. In this particular case this near history develops in the dashpot a reaction which is extended over the near future to counteract overtravel of the pilot piston valve from its optimum course in that near future. As stated, at any instant the relation of the dashpot elements is representative of a summation of the near history of operation of the device as a whole. But considering an initial status, before there has been any signal-effected displacement of the pilot element, or after some extended period of no signal reception, longer than a near-history period, it is apparent from the disclosure that the pressure in chambers 21, 50 and 55 and also within the bellows 56—57 is balanced. Any change in this condition arises from a subsequent signal-responsive displacement of the pilot and its rigidly connected piston-stem 37. That displacement immediately creates, by the movement of the piston-stem 37, a plus or minus differential in the throttled dashpot chamber 50. Only that differential is at this instant to be considered. If it is positive, as on up motion of the piston-stem, the flow effort is out from chamber 50, at the orifice 52 to the then lesser-pressure chamber 21 and also at the upper part of chamber 50 to the lesser-pressure chamber 55. In the latter the bellows is proportionately compressed thereby in effect expanding the chambers 50—55 and reducing the inhibiting effect upon the piston-stem 37, also thus modifying the differential which is further being modified by continued relief at the throttling orifice 52. The total action is cumulative and degenerative, the pilot being permitted to respond rapidly and without excessive inhibition by the differential pressure upon the head of the piston-stem 37, this action then becoming a near-history factor as to following behaviour.

Under a negative differential, as on down motion of the pilot and its piston-stem, a reverse operation takes place.

In addition to the action as described above, the dashpot has a further effect on the stability of the control, for as the power piston responds to a displacement of the pilot piston valve from closed-off position, its response acts to tend to close the pilot ports because the dashpot action (except as may possibly and properly be oppositely influenced by other near history of operation) is in a direction to restrain the pilot piston valve from following the power piston. This tendency to close the ports, as response of the output to signal begins and continues, is effective in preventing overtravel of the output element.

In the drawings, the hydraulic fluid at inlet or supply pressure is indicated by the relatively heavy stippling seen in the end chambers 20, 21, the connecting longitudinal passages 28 and within the bore of the power piston adjacent and enveloping the opposite ends fo the pilot-piston valve body, and also, as above described, within the pressure-compensator bellows 56. Fluid at operating pressures, as in the end portions 26, 27 of the operating chamber 25, is represented by the stippling of intermediate density there seen. Normally pressures in these end portions will not equal one another, even with the pilot piston valve in its neutral position as shown, due principally to any load applied externally to the output shaft 15. Fluid at exhaust pressure, in the space between the power piston members 18, 19 and communicating with the fluid outlet 23, is represented by still lighter stippling. Fluid of the governing head, as in the chambers 50 and 55 and in the further chamber 60 now to be described, is indicated by the fine slightly wavy lining or striation marks, signifying the tremulous or near-tremulous status of said fluid, as will be explained.

In considering the cross-sectional Fig. 5, or comparing it with Fig. 2, it will be noted that in Fig. 5 the pilot element 30 is assumed to have been moved from its centered or port-closing position of Fig. 2 (with reference to the power output piston 15), in this case in the down direction. Hence all fluid-containing passages at the central portion of the figure are stippled to represent the fluid at operating pressure, similarly as in the upper operating chamber portion 27 of Fig. 2.

Referring still to the governing head, there is also in fluid communication with the dashpot chamber 50 a further chamber 60 and associated means having a readying or conditioning effect through the fluid relative to the parts movable therein. This means, to be referred to as a friction neutralizer or dither element, is shown in Fig. 4, a section corresponding to the upper portion of Fig. 2 but taken on the different vertical plane indicated by the section line 4—4 of Fig. 3.

Said chamber 60 is divided into upper and lower portions 61, 62 by a flexible diaphragm 63. Hydraulic fluid at supply pressure (dense stippling) is admitted to the lower chamber portion 61, from the end chamber 21, by an opening 64 in the plate 7a. The upper chamber portion 62, at the opposite side of the diaphragm 63, is accessible to the governing-head fluid, as in the dashpot cylinder 50 and the bellows chamber 55, as by means of a communicating passage 65. The diaphragm 63 is held and sealed peripherally as between pressure-tight bushings or collars 66, 67 fixedly seated in the chamber 60 and providing a part of the magnetic unit to be described.

Above the upper chamber portion 62 is an electric vibrator coil 68 shown concentrically surrounding a dependent boss 69 which may be integral with the head section 7 of the frame. This coil 68 acts upon a magnetic armature element comprising a small block 70 having a central threaded stem 71 extending centrally through the diaphragm 63 and receiving a clamping and sealing nut 72 which is also comprised in the armature of the magnetic unit. Said armature element 70 to 72 as a whole is guided for its relatively minute vibration or fluttering action under the influence of the coil 68, as by a pin 73 fixed in and extending centrally from the boss 69 and slidably received at its lower end in a corresponding guide recess in the block. The block 70 desirably has one or more diametral or other passages 74 for the fluid of the governor head, communicating with the inner end of the pin-guiding recess and serving to relieve fluid pressure between the end of the pin 73 and the block 70 which pressure might otherwise act to restrain vibration of the armature element in response to the pulsating magnetic field generated in the electric coil 68. The vibrator means as shown in the governing head in Fig. 4 is particularly adapted for alternating current operations and the vibration may be regulated by varying the current frequency. For direct current applications, and for vibration control in any instance, conventional or preferred interrupter means or the like may be provided, on or in the governing head of the controller, or otherwise arranged.

The effect of the described dither means, including the chamber 60 and described parts associated with it, is to develop a pressure pulsation in and throughout the governing head fluid. This pulsation is transmitted by the fluid to the pilot piston valve extension 37 and consequently to the pilot piston valve 30 as a whole, further reducing Coulomb friction. The light wavy striations shown in Figs. 2 and 4 at the fluid-containing portions of the governing head chambers 50, 55 and 60 are diagrammatic of this pressure pulsation, whereby the pilot element is in effect maintained in a continual state of actual or incipient oscillation. The degree of such dither and its condition as to whether potential or actual is calculated with reference to the particular installation of the control device, and may be selected to any required amount both as to amplitude and frequency by regulating the current to the coil 68; see Fig. 4. This current is supplied from any suitable source, independently of the input signal to the solenoid 40. The dither coil terminals 68a, 68b are seen in Figs. 1 and 3.

The described components of the governing head, including the dither means, the damping means associated with the chamber 50, and the elastic means related to the chamber 55 contribute to stabilization of the control, in the sense of promoting accurate regularity and smoothness in performance, that is, always the same response to the same signal conditions in any given application.

The elastic chamber and dashpot mechanism, as already pointed out, serves particularly to anticipate and compensate for error in the system served by the control. For example, where the control is installed in or in connection with a servo-loop, such as one including a director instrumentality and a gun mount to be controlled, the stabilizing action of the governing head is effective through the entire servo-loop, taking into account influencing factors external to the control device itself. The concept of a servo-loop is illustrated in Fig. 10, in the instrumentalities at the center and left in said figure, wherein operating and control influences are transmitted around a closed path, circuit or loop.

The described dither means of chamber 60 is instrumental in reducing friction and is accordingly effective in sensitizing and stabilizing the control. It may be adjusted to be effective primarily on the pilot piston valve of the low-power system or by increasing its amplitude it may be made effective on the pilot piston valve, power piston, the driven subject, and in a servo-loop on the system as a whole. It may be assumed that if the pilot piston valve is induced by dither action to vibrate at an amplitude equal or slightly less than valve face overlap at the pilot valve ports, the dither will be effective on the pilot piston valve only. But if the dither is of an amplitude to open the ports slightly of itself alternately in each direction, the power piston will be driven alternately a small amount in each direction by the action of fluid at supply pressure. Accordingly the output shaft will pulsate longitudinally. This pulsation may be adjusted for any desired external effect.

Further with reference to the governing head, it will be apparent that the component features are complementary in their contribution to stabilization. The damping and elastic reservoir means 50 to 59 is responsible for error anticipation and compensation, modifying the absolute motion of the pilot piston valve (with reference to the frame), while the dither element 60 to 74 comprising the vibrant "live" diaphragm 63 serves to reduce Coulomb friction, by the pressure pulsation fluidly transmitted to the pilot piston valve at its extended stem 37. Their effects are hydraulically combined and hydraulically applied to the power piston.

The elastic reservoir 55 to 56 and associated dashpot means including the pilot-piston valve stem 37 and chamber 50 in effect present a dashpot chamber having an automatically continuously regulated damping action, proportioned to the requirements of the given situation. This means may also be described as a variable hydraulic coupling effective between the pilot element and the frame of the control unit as represented by the walls of the dashpot chamber 50. The elastic reservoir hydraulically coupled to the pilot-piston valve dashpot-piston unit accomplished principally the effect of axial flexibility as between the pilot piston valve and the dashpot piston while at the same time avoiding objectionable features of a mechanical spring coupling between the body of the pilot element 30 and the stem-extension or dashpot piston 37. The novel construction and arrangement here referred to has the advantages of simplification through the elimination of separate moving parts and the elimination of the need for supporting and aligning the dashpot piston by bearings which themselves would present additional sources of Coulomb friction in the low-power system. In this connection the annular orifice as at 52 around the dashpot piston 37 is again noted, with reference to its plural function of affording the desired throttling and viscous drag effect as to the adjacent fluid and also obviating the need for sealing this piston against leakage while at the same time eliminating sliding friction at this location.

Considering still the governing head, the component feature of the dither means 60 to 74 as herein disclosed, complemental to the damping element, involves the novel concept and principle of incipient vibration. This dither acts on the principle of application of pressure rather than on the principle of positive displacement; accordingly it may result in a displacement or not, depending on the extent of the dither adjustment as already described. As previously indicated, its action or functioning status may be a real vibration, characterized by a bodily reciprocating movement of a particular part. But in general what the invention here contemplates is a readying condition, a rendering "live," such that the element concerned, as for example the pilot piston valve herein, is so functionally conditioned that it will respond appropriately to the minimum external influence as to which its response is desired. This is accomplished by application of a pulsating force such that friction is almost but not quite overcome, that is, to the extent that vibration is almost but not quite induced in the pilot element. The novel feature, in devices of the class here mentioned, of transmitting forces, displacement or motions from one mechanical element to an associated or cooperative low-power mechanical element by hydraulic means is here introduced, whereby extraneous and undesired influences which would objectionably modify the critical performance of a controller are minimized. Such influences are for example, friction, backlash, binding and massiveness which are usually characteristic of mechanical means of transmission. Hydraulic means in this relation also promote compactness and bulk reduction.

The novel principles of the invention as herein disclosed, including that for the transmission of force to and within relatively low-power systems as exemplified by the means associated with the governing head, are facilitated in the particular structure illustrated, here again noting such features as the single alignment axis for all moving parts except those hydraulically coupled, particularly the pilot element 30 and the power output element 15 and their constituent members, which operational alignment axis is herein made coincident with a single machining axis for the parts concerned. Supplementary hydraulically-coupled elements, such as those of the governing head, are offset from the main alignment axis, for convenience and compactness in design. This is permissible in view of the fact that geometric alignment is not significant in the functioning of a hydraulic coupling.

Thus, in general, hydraulic elements are availed of in the practice of the invention, rather than the mechanical (in its more limited sense) elements which would require solid or non-fluid links, pivots and the like with their attendant problems as to alignment, friction, backlash and bulk. In the controller of the invention, the main parts are inherently self-aligning, there being but one alignment center which is also the center on which the parts are turned or manipulated in machining or otherwise forming them, most of them being susceptible of production on a precision lathe. Hence no adjustment for alignment is required, which adjustment presents a substantial problem in most controllers as heretofore known.

In the moving parts operated at input or low-power level, particularly the pilot element, any coulomb friction is minute, since the only sliding contacts are at the reduced stems of said element, and there are confined to a substantially lineal contact at the jewel or other anti-friction bearings. These latter serve to center the pilot element with respect to the fluid-port lands while preventing it from actually touching them.

From the foregoing it is evident that the controller or control means of the invention contains no possible source of mechanical backlash. Preferably hysteresis effects, the magnetic analogue of backlash, are minimized in the magnetic circuits of any of the illustrated embodiments. If desired, provision may be made for removal of any trapped or entrained air.

It will be understood that the output of the controller, at the higher power level, is externally available at the power piston or output shaft portion 16. The latter is adapted for connection, as by means of the socket 16a or otherwise, with the subject to be controlled. Such connection may be direct or indirect, as for example to the adjustable element of a variable-speed hydraulic or other transmission through which the particular controlled subject is driven, for example, a rudder of a vessel, a steering element of land or air craft, the mount of a gun, or an automatic tool carriage or other element, to mention but a few ordinarily indirect-coupled instances. Examples in which the controller output displacement or its power level is adequate to perform directly the work of driving or moving the controlled subject, through appropriate direct coupling to the controller output, include numerous valves, gates and the like, gauges, indicators and a wide variety of subjects which operate with relatively small displacements, such as for the stabilization of vehicle bodies displaceable from their carriages.

The schematic representation in Fig. 10 of typical systems incorporating the controller of the invention is self-explanatory. Signals indicative of directer performance may be continuously fed, during operating periods, from the director or information source to an error measuring means or station, which also receives signals representative of the actual performance of the driven or controlled subject constantly during operation of the system. The two sets of signals are in effect compared, combined or their difference relatively measured by the "error measuring" means (see Fig. 10), which transmits a resultant set of "error" signals indicative of error in one or the opposite direction, or no error (positive, negative or zero). These error signals are supplied to my controller, effecting the corresponding displacement (or non-displacement) of its pilot. From the controller the power output goes to the controllable driving means (for example, variable-speed hydraulic or other transmission) and thence to the driven subject, in the case of indirect drive as represented in full lines in Fig. 10, or directly to the latter in appropriate cases, in cases of direct drive as indicated by the broken line in said schematic figure.

In Fig. 10 the director or information source, at the right in the figure is shown as a dotted-line enclosure to indicate that such signal source may be dispensed with in some systems, the directed performance then being represented by a preselected setting of a scale, dial or other form of index as a reference against which the actual performance is measured or compared and the appropriate error signal sent to the controller. Such predetermined index, which may be adjustable in accordance with the given control problem may be located at the "error measuring" instrumentality or station, or remote from it, one example in which its use is appropriate being that of maintenance of a selected level of liquid in a container. Also, as noted with respect to the director signal in Fig. 10, such signal may be constant or variable, and where it is variable it may be systematic, following some recurrent pattern, or it may be random. In any instance the operation as a whole, including the director signal and the control response may be more or less intermittent but in general the invention is more particularly applicable to uses where the periods of activity are sustained beyond mere instantaneous and sporadic operations such as circuit-making or breaking.

To mention but one further specific field of application for the controller of the invention, it is especially adaptable in novel combinations and systems for positively counteracting, neutralizing or compensating for disturbances of various types in a controlled subject, as for example in controlling power directed to stabilizing a subject against shock or other disturbance so as to maintain a given desired condition therefor, such as continuance of a selected axial or other position, thus serving in effect as a powered shock-compensator, as contrasted with the mere dissipation of shock characteristic of the usual so-called "shock-absorber."

From the foregoing taken in connection with the drawings of illustrative embodiments of the invention, it will be apparent that the latter importantly includes in its principles and methods, exemplary means for the practice of which are herein illustrated and/or described, one or more of the following: carrying a primary or pilot element, generally of a relatively low power order, with a power output element, generally of a higher power order; determining the flow of the output power-supplying fluid solely by the relative position of the input or pilot element and of the output element, without interposing or appending other mechanical means; imposing one or more auxiliary forces upon the input or pilot element in a manner independent of the instant output position of the device; carrying the fluid-flow determining means with and incorporating it within the pilot and the output elements, and in such fashion that the relative position of said elements determine the opening and closing action of said means; inducing the motion of the output element directly onto the pilot element, without requirement of independent and specific means of feeding-back the output; and hydraulically governing and inhibiting the absolute motion of the pilot element.

Certain of the fluid passages and chambers have been referred herein to as containing fluid at supply pressure, and others at exhaust pressure, outside port 22 then being regarded as the inlet or supply entrance and outside port 23 being regarded as the exhaust or outlet. It will be understood that terms "supply" and "exhaust" are used merely to identify the locations concerned and to distinguish one from the other in the given operation of the device, and that the disclosed device may as well be operated in reverse hook-up as to supply and exhaust, port 23 becoming the inlet and port 22 the outlet, with obvious appropriate reversal of the land and groove areas of the pilot piston valve or else with interchange of the power piston passages such as 18a, 19a communicating with the pilot piston valve fluid-passage areas.

My invention, either as to methods or means, is not limited to the particular steps and embodiments as herein illustrated and/or described, its scope being pointed out in the following claims.

I claim:

1. A hydraulic controller comprising a cylinder including a mid chamber partitioned between fluid-receiving end chambers, a piston element reciprocable in the mid chamber and having coaxial shafts slidably extending into the respective end chambers, said piston and shafts formed with a common axial bore, a cylindrical pilot-piston valve element coaxially disposed in said bore for governing fluid flow therein relative to the piston element, means carried with the piston element for axially aligning and tending normally to center the pilot-piston valve element in the bore of the piston element subject to low-power displacement therein and relative thereto in either longitudinal direction, and electro-magnet means carried jointly by said elements for effecting such displacement.

2. For hydraulic controllers having a casing and an output piston subject to hydraulic fluid in the casing, a fluid-valving pilot element for oppositely displaceable disposal in a volume of the hydraulic fluid, said pilot element having at one end a stem-like piston, and dashpot means movably receiving said piston and having a fluid-throttling orifice through which the piston extends coaxially, said dashpot means including a hydraulically associated elastic element constituting said means as a variable hydraulic coupling between the piston and a defining wall of the dashpot means and automatically affording therefor continuous proportioning regulation of the action of the dashpot means with respect to the piston.

3. A controller comprising a container ported for inlet and outlet of hydraulic fluid and providing aligned spaced fluid chambers and an intermediate operating chamber; an output element including a piston reciprocable in said operating chamber and coaxial, opposed tubular shafts movable therewith and in communication with said fluid chambers; a pilot element resiliently supported in and by the output element for normal, elastically balanced, operating chamber sealing positioning and for input signal induced, opposite axial displacement longitudinally relative thereto, and communicable passages on said elements for admitting supply fluid to said operating chamber selectively to either side of said piston upon said displacement.

4. The structure of claim 3, wherein the pilot element is constructed and arranged to have an overall density substantially equal to that of the hydraulic fluid displaced thereby.

5. A controller comprising a cylindrical body ported for inlet and outlet of hydraulic fluid and having coaxially therein a fluid receiving piston chamber and fluid chambers spaced at opposite sides of the piston chamber; an output element including a piston oppositely movable in the piston chamber and having portions rigid and coaxial therewith oppositely extending into the chambers; a control element displaceably carried in and by said output element; opposed, balanced elastic means engaging both said elements for normal relative axial positioning thereof; communicable ports and passages on the elements supplying fluid to the piston chamber selectively to either side of the piston under relative axial displacement of said elements for output signal controlling movement of said piston, and electromagnetic input signal sensing means on said elements for effecting said relative axial displacement thereof.

6. A controller comprising, in combination, a containing body having ports for inlet and outlet of hydraulic fluid and providing aligned, spaced fluid chambers and an intermediate operating chamber; an output element including aligned tubular shafts and an intermediate centrally open piston, said shafts and piston longitudinally movable coaxially in said chambers with the shafts in communication with the respective spaced chambers at opposite sides of the piston; a pilot element concentrically disposed in the output element for displacement axially in one and the opposite direction relative thereto, said element constructed and arranged to have an average density substantially equal to that of the fluid displaced thereby; opposed, balanced resilient means stressed between transverse wall portions on said elements and normally relatively positioning the same in longitudinally central relation; passages in said piston for fluid communication between the respective ends of said operating chamber and selectively the adjacent tubular shaft or one of said fluid ports; port and valve means on the pilot element adapted to close off said passages or to open them for fluid communication in one or the other of said selective manners and oppositely at the respective sides of said piston according to the relative position of said elements, and electro-magnetic signal responsive means conjointly carried by said elements for axially displacing the pilot element from said normal central position relative to the output element.

7. The structure of claim 6, wherein said resilient means comprises coil springs.

8. A hydraulic controller comprising a cylinder ported for inlet and outlet of hydraulic fluid and including an operating chamber spacing aligned fluid chambers and a dashpot chamber communicating with one of said chambers; an output element having a piston reciprocable in the operating chamber and coaxial shafts slidably extending into the respective end chambers, said piston and shafts formed with a common axial bore ported on one and the other side of said piston; a pilot valve reciprocable in said bore for admitting output signal determining flow from said chambers to said operating chambers selectively to one and the other side of said piston; opposed resilient means engageable with said element and said valve and normally elastically axially balancing said valve in port sealing position in said bore; electro-magnetic input signal responsive means on said element and said valve for effecting relative displacement of the valve from said normal position; and an elongated stem on said pilot valve slidable in said dashpot chamber.

9. A controller as claimed in claim 8, wherein said dashpot chamber has an aperture receiving said stem which is proportioned for throttling of the fluid flow to and from the chamber attendant upon reciprocation of said pilot valve relative to said chamber.

10. A controller according to claim 8, wherein said dashpot has a damping chamber receiving said stem and also a fluid reservoir subject to fluid pressure at a flexible wall thereof whereby to afford automatically continuous proportioning regulation of the damping action in said chamber.

11. A controller according to claim 8, and force dither means including a flutter mounted body in said dashpot chamber and electro-magnetic means for vibrating said body whereby hydraulic pulsations are imposed on said stem.

12. A controller comprising a frame ported for inlet and outlet of hydraulic fluid and having an operating chamber and coaxial therewith a dashpot chamber; an output element including centrally a piston reciprocable in said operating chamber; a pilot valve carried by said element and reciprocable therein to admit the fluid supply from the inlet to the operating chamber selectively to one and the other side of said piston; opposed, balanced, resilient means on said element engaging said valve normally to position the valve longitudinally relative to the element; input signal responsive means on the element for displacing the valve from said normal position; an axial, piston forming stem on the valve reciprocable in the dashpot chamber; a dither element flutter mounted in said dashpot chamber; and frame mounted means for vibrating said dither element whereby to impress static friction minimizing hydraulic pulsations on said pilot valve.

13. A controller as in claim 12, wherein the dashpot chamber is provided with a valve stem receiving orifice proportioned to permit throttled fluid flow to and from said chamber about and attendant upon reciprocation of said stem, and remote therefrom is provided with a flexible wall subject to inlet fluid pressure and automatically affording continuous proportioning regulation of the damping action on said stem.

14. For hydraulic controllers having a casing and an output element subject to hydraulic fluid in the casing, a pilot element hydraulically buoyed and elastically balanced for reciprocation in said output element, said pilot element having at one side a stem-like piston; dashpot means movably receiving said piston and having a fluid throttling orifice through which the piston extends coaxially, said dashpot means including a hydraulically associated elastic element constituting said means as a variable hydraulic coupling between the piston and a defining wall of the dashpot means and automatically affording a continuous regulation of the damping action thereof; and dither means hydraulically associated with said dashpot means for impressing vibration inciting pressure pulsations on said piston.

15. In a hydraulic controller a chambered frame having an inlet for fluid under pressure and a fluid outlet, an output element including a piston reciprocable in the frame; a pilot valve axially movable in the piston; cooperable port and passage means on the piston and valve for governing fluid flow to and from the piston; opposed resilient means on said element engaging said valve normally to elastically balance the valve in piston port sealing position longitudinally of the element; and input signal sensing means on the element for axially displacing the valve from said piston port sealing position.

References Cited in the file of this patent

UNITED STATES PATENTS

| Number | Name | Date |
|---|---|---|
| 397,958 | Barth | Feb. 19, 1889 |
| 531,792 | Forslund | Jan. 1, 1895 |
| 559,526 | Heermans | May 5, 1896 |
| 901,613 | Herrgott | Oct. 20, 1908 |
| 1,151,522 | Hodgkinson | Aug. 24, 1915 |
| 1,365,347 | Schneider | Jan. 11, 1921 |
| 1,510,436 | Englesson | Sept. 30, 1924 |
| 1,511,425 | Roucka | Oct. 14, 1924 |
| 1,708,507 | Jordon | Apr. 9, 1929 |
| 1,732,813 | Kasley | Oct. 22, 1929 |
| 1,790,620 | Davis | Jan. 27, 1931 |
| 1,830,636 | Bragg | Nov. 3, 1931 |
| 1,934,691 | Baker | Nov. 14, 1933 |
| 2,000,805 | West | May 7, 1935 |
| 2,021,066 | Huxford | Nov. 12, 1935 |
| 2,030,986 | Havill | Feb. 18, 1936 |
| 2,105,473 | Dean | Jan. 18, 1938 |
| 2,237,799 | Nest | Apr. 8, 1941 |
| 2,261,827 | Brown | Nov. 4, 1941 |
| 2,270,059 | Kahr | Jan. 13, 1942 |
| 2,301,576 | Parsons | Nov. 10, 1942 |
| 2,317,549 | Muller | Apr. 27, 1943 |
| 2,333,184 | Kalin | Nov. 2, 1943 |
| 2,350,117 | Kline | May 30, 1944 |
| 2,368,628 | Bates | Feb. 6, 1945 |
| 2,374,593 | Ernst | Apr. 24, 1945 |
| 2,384,962 | Pohl | Sept. 18, 1945 |
| 2,395,671 | Kleinhans | Feb. 26, 1946 |
| 2,409,190 | Brown | Oct. 15, 1946 |
| 2,423,935 | Hart | July 15, 1947 |
| 2,424,901 | Richolt | July 29, 1947 |
| 2,475,313 | Davis | July 5, 1949 |

FOREIGN PATENTS

| Number | Country | Date |
|---|---|---|
| 4,186 | Great Britain | 1878 |